United States Patent [19]

Streckmann et al.

[11] 4,401,360
[45] Aug. 30, 1983

[54] OPTICAL SLIP RING

[75] Inventors: George L. Streckmann; Jerry W. Yancy, both of Dallas, Tex.

[73] Assignee: Texas Instruments Incorporated, Dallas, Tex.

[21] Appl. No.: 174,974

[22] Filed: Aug. 4, 1980

[51] Int. Cl.³ .............................................. G02B 7/26
[52] U.S. Cl. ................................ 350/96.15; 250/227; 250/236; 350/96.18; 350/96.20
[58] Field of Search ............... 350/96.15, 96.16, 96.18, 350/96.20, 96.21; 250/227, 236; 357/19, 30; 310/232

[56] References Cited

U.S. PATENT DOCUMENTS

| | | | |
|---|---|---|---|
| 3,922,063 | 11/1975 | Marrone | 350/96.15 |
| 4,027,945 | 6/1977 | Iverson | 350/96.20 X |
| 4,190,318 | 2/1980 | Upton, Jr. | 350/96.20 |
| 4,278,323 | 7/1981 | Waldman | 350/96.20 |
| 4,303,300 | 12/1981 | Pressiat et al. | 350/96.20 |

OTHER PUBLICATIONS

Burke et al., "Fiber Optic Repeater Bypass Switch", *IBM Tech. Discl. Bull.*, vol. 18, No. 2, Jul. 1975, pp. 481–482.

Cunningham et al., "Noncontact Optical Communication Between Moving Stations," *NASA Tech Briefs*, Fall 1978, p. 399.

*Primary Examiner*—John D. Lee
*Attorney, Agent, or Firm*—Thomas G. Devine; James T. Comfort; Melvin Sharp

[57] ABSTRACT

An optical slip ring provides optical communication between a pair of members free to rotate with respect to each other. These members may be a pair of optical fibers, an electrical conductor and an optical fiber or a pair of electrical conductors. One member is attached to a first mounting device and the other member is attached to a second mounting device. One optical receiver is positioned in the center of the first mounting device on a common axis of rotation with respect to the second mounting device. The other optical receiver is mounted on the second mounting device, positioned on the common axis of rotation. One optical emitter is mounted off center on the first mounting device and the other optical emitter is mounted off center on the second mounting device. The optical emitter mounted on the first mounting device is aimed at the optical receiver mounted on the second mounting device, and the optical emitter mounted on the second mounting device is aimed at the optical receiver mounted on the first optical device. Relative rotation between the members does not change the optical communication between the optical emitters and their respective optical receivers.

25 Claims, 7 Drawing Figures

OPTICAL SLIP RING

BACKGROUND OF THE INVENTION

1. Field of the Invention

This invention relates to optical coupling and in particular to an optical slip ring for providing optical communication between rotating members.

2. Description of the Invention

Conventional slip ring assemblies are employed to achieve a continuous electrical connection between a rotor and a stator. In marine seismic exploration, (the application of this preferred embodiment) such slip rings are used to transfer data signals between an on-reel data source and a stationary reel housing. This arrangement permits the continuous transfer of data signals for any reel position desired.

In the prior art, friction contacts were employed and capacitive coupling was employed for such slip ring assemblies. For friction contact slip rings, problems such as excessive wear, contact bounce, and mechanical complexity create special difficulties. In the case of capacitive coupled slip rings, noise susceptibility and lack of DC coupling are prominent problems.

The present invention overcomes these problems. In addition to being highly noise resistant, the optical slip ring provides for direct DC coupling of the data signals. Also, the optical slip ring eliminates the wear and bounce problems encountered in the use of contact slip rings. The optical slip ring permits continuous transmission of high frequency digital information.

BRIEF SUMMARY OF THE INVENTION

In this preferred embodiment, command and data signals to and from a marine seismic cable are optically coupled through an optical slip ring between a seismic cable take-up reel and cable on the deck of a towing vessel. In this preferred embodiment, the deck cable remains stationary and is known as the "reel to dog house" (RTDH) cable. The towed cable is wound on the take-up reel and through the optical slip ring, maintains contact at all times with the RTDH cable.

To reduce the size of the seismic cable, optic fibers are used in the preferred embodiment of this invention to convey data signals from transducers connected to the seismic cable to the appropriate signal handling electronics. Coupling is accomplished by use of the optical slip ring. Also in the preferred embodiment, command signals are sent to the seismic marine cable by way of an optical fiber from the control electronics, to the optical slip ring, and then over a twisted pair of electrical conductors through the seismic cable. In another embodiment of this invention, the command signals are sent through the towed seismic cable by way of optical fibers. In still another embodiment, all of the signals are sent via electrical conductors but are coupled through the optical slip ring.

The optical slip ring comprises a pair of mounting devices which are free to rotate with respect to each other. The RTDH cable is attached to one of the mounting devices (stator) and the towed seismic marine cable is attached to the other mounting device (rotor).

An optical receiver is mounted on each of the mounting devices at the axis of rotation therebetween. At least one optical emitter in this preferred embodiment, is mounted off center on each of the mounting devices and aimed at the optical receiver on the other mounting device so that through a 360° revolution, the optical communication is constantly maintained. Intersection of the optical signals from the emitters does not cause interference.

In the preferred embodiment, both optical emitters are connected to optical fibers and convert optical signals to corresponding electrical signals which activate light emitting diodes to provide optical signals for communication between the towed cable and the RTDH cable. One optical receiver is connected to an optical fiber in the towed cable, receiving an optical signal, converting it to a corresponding electrical signal and again converting to a corresponding optical signal. The other optical receiver is connected to an electrical conductor in the RTDH cable and receives optical signals, converting them to corresponding electrical signals.

Another embodiment of this invention involves the use of a focusing lens placed between the mounting devices. The optical emitters are then aimed so that the lens deflects the emitted light to the respective receiver.

The principal object of this invention is to provide a reliable and efficient means of coupling signals between rotating members.

This and other objects will be made evident in the detailed description that follows.

DETAILED DESCRIPTION

Figure 7:
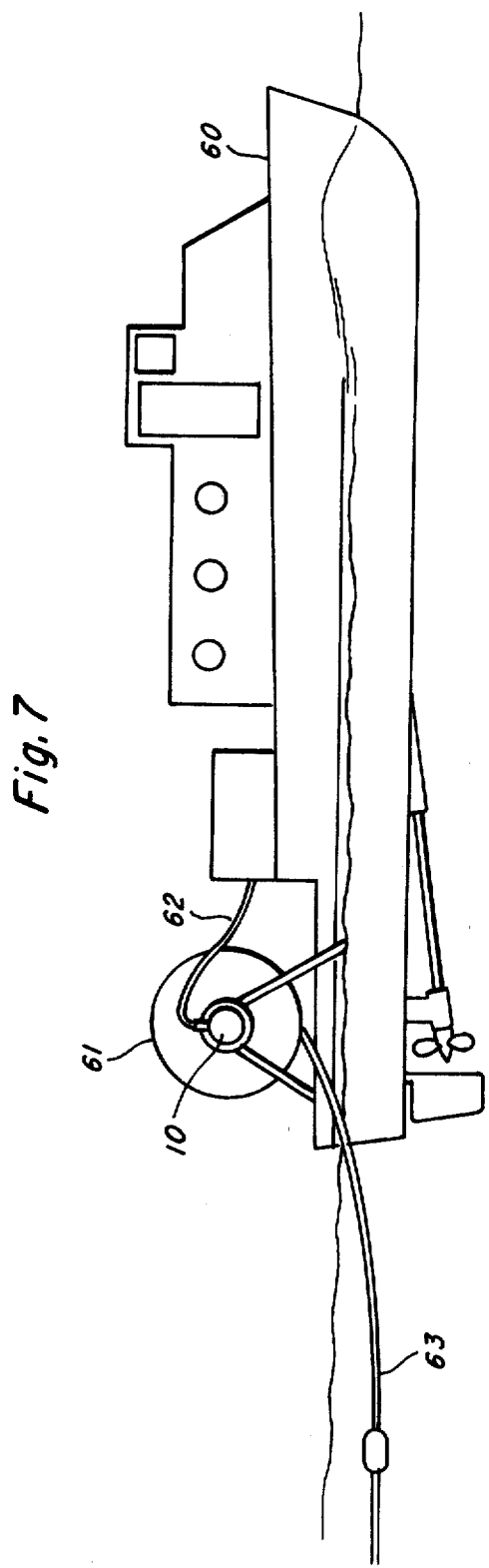
FIG. 7 illustrates a vessel for towing the seismic marine cable of this preferred embodiment.

Referring first to FIG. 7, a vessel 60 is shown having a reel 61 upon which a towed marine seismic cable 63 is wound. An RTDH cable 62 is shown on the other side of the reel 61. Optical coupler assembly 10 is shown attached to reel 61.

Figure 1:
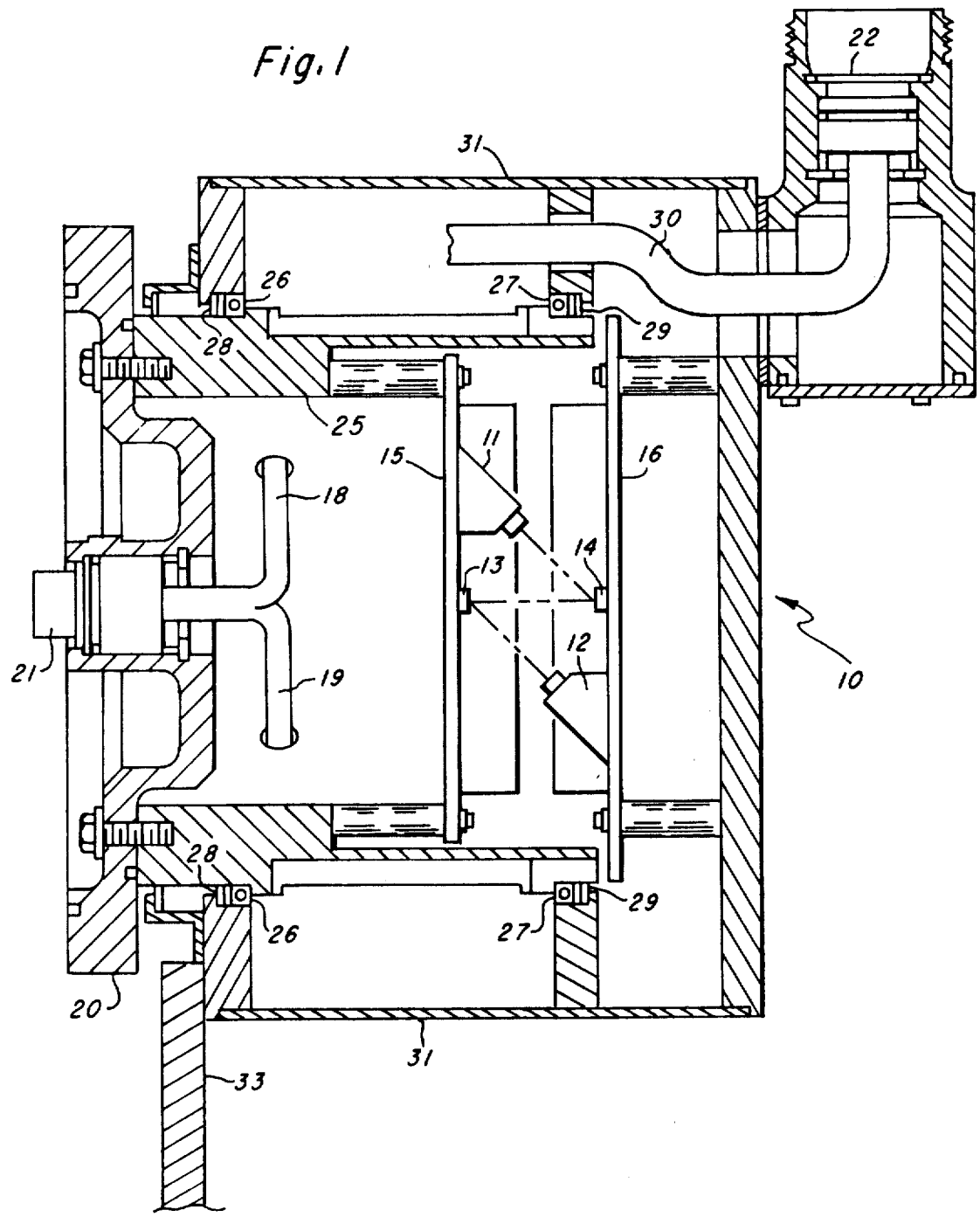
FIG. 1 is a cross section of the implementation of the optical slip ring of this invention.

FIG. 1 is a cross sectional view of the optical coupler assembly 10. Bracket 33 is attached to housing 31. Connector 21 is attached to the cable 63 and connector 22 is attached to cable 62. Cables 18 and 19 come from connector 21 and, in this preferred embodiment, are connected to mechanical slip rings and are used primarily for the transmission of power. The mechanical slip rings are not shown, but are well known and not part of this invention. Connector 21 is fixed to bracket 20 which in turn is affixed to inner housing 25.

Inner housing 25 is free to rotate within housing 31 on bearings 26 and 27, sealed by seals 28 and 29. Rigidly affixed to inner housing 25 is printed circuit board 15. Optical receiver 13 and optical emmitter 11 are both mounted on printed circuit board 15, which together with inner housing 25 forms a first mounting device. In this preferred embodiment, optical emitter 11 is comprised of an optical fiber receiver circuit, including a photo diode, specifically a pin diode, and an optical fiber transmitter circuit including a light emitting diode (LED). This combination provides for the reception of optical signals, conversion to electrical signals and emission by way of the LED as optical signals. In this preferred embodiment, a type SPX 4140 optical fiber transmitter circuit and a type SPX 3620 optical receiver circuit both made by Spectronics Division of Honeywell Incorporated are employed. Optical receiver 13 is also comprised of the optical fiber receiver circuit and the optical fiber transmitter circuit for receiving optical signals through the air gap of the optical slip ring by way of the photodiode and converting to electrical signals which are then converted into optical signals by the optical fiber transmitter circuit for transmission to an optical fiber. Both the SPC 3620 receiver IC and the SPX 4140 transmitter are simply design selections and equivalent components are, of course, available.

Printed circuit board 16 is rigidly affixed to the housing 31 and has optical receiver 14 and optical emitter 12 affixed thereto. Optical emitter 12 is in optical communication with optical receiver 13 and optical receiver 14 is in optical communication with emitter 11. When printed circuit board 15 rotates with the inner housing 25, the optical communication remains intact.

Figure 2:
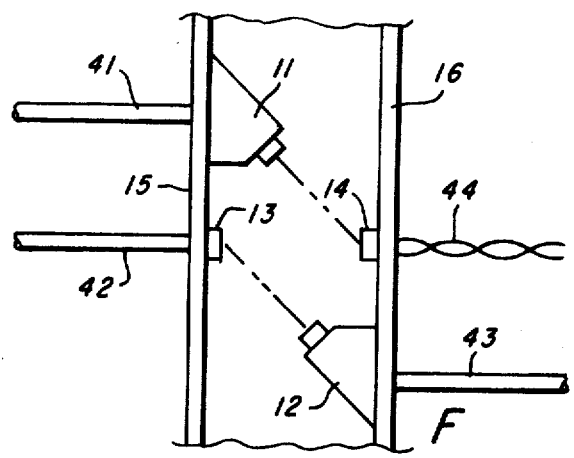
FIG. 2 schematically illustrates the preferred embodiment of the optical slip ring of this invention.

FIG. 2 shows optical fiber 41 connected to printed circuit board 15 and electrically connected to optical emitter 11. Optical fiber 42 is also connected to printed circuit board 15 and electrically connected to optical receiver 13. Optical fiber 43 is connected to printed circuit board 16 and electrically connected to optical emitter 12. Electrical conductor 44 is connected to printed circuit board 16 and electrically connected to optical receiver 14. Optical receiver 14 is simply the fiber optic receiver circuit and does not require the fiber optic transmitter circuit mentioned above which is used in connection with optical receiver 13.

Figure 3:
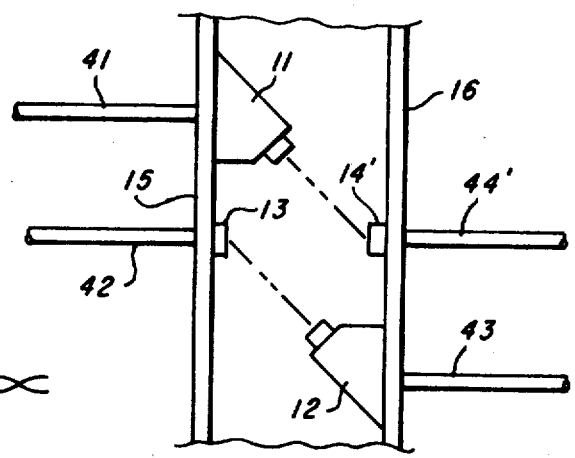
FIG. 3 illustrates optical slip ring communication between all optical fibers.

FIG. 3 illustrates a circuit identical to that of FIG. 2 except that optical receiver 14 and electrical conductor 44 is replaced by the combination of optical receiver 14' and optical fiber 44'. Optical receiver 14' utilizes both the fiber optic receiver and transmitter circuits.

Figure 4:
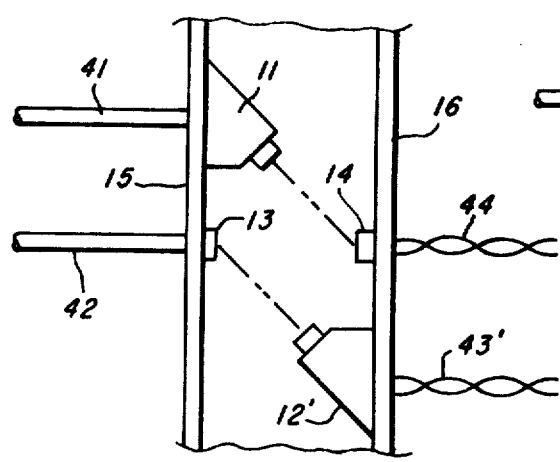
FIG. 4 illustrates optical slip ring communication between a pair of optical fibers and a pair of electrical conductors.

FIG. 4 illustrates an optical slip ring identical to that shown in FIG. 2 except that the light emitter 12 and optical fiber 43 are replaced by light emitter 12' and electrical conductor 43'. Optical emitter 12' is simply a fiber optic transmitter circuit.

Figure 5:
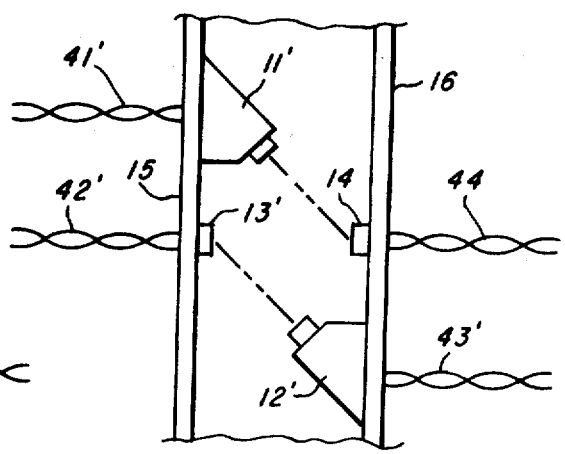
FIG. 5 illustrates optical slip ring communication between all electrical conductors.

FIG. 5 illustrates an optical slip ring identical to those described in FIGS. 2-4 except that all of the elements are electrical conductors 41', 42', 43' and 44. Receivers 13' and 14 are simply fiber optic receiver circuits, optical emitters 11' and 12' are simply fiber optic transmitter circuits.

Figure 6:
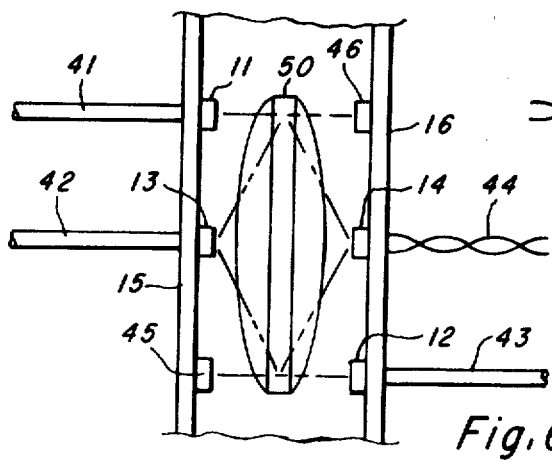
FIG. 6 illustrates a lens for directing the emitted optical signals to the optical receivers in an optical slip ring.

FIG. 6 illustrates the use of lens 50 interposed between printed circuit boards 15 and 16. Also shown are additional emitters 45 and 46, emitter 45 being connected to optical fiber 41 and emitter 46 being connected to optical fiber 43. In this embodiment, four emitters are affixed to each of circuit board 15 and 16 to provide additional light output. Lens 50 focuses the light emitted from emitters 11 and 45 onto PIN diode 14. Lens 50 focuses light emitted from emitters 12 and 46 onto PIN diode 13. Lens 50 may, of course, be used with other combinations shown.

It should be noted that a single optical fiber transmitting through an optical slip ring to another single optical fiber or electrical conductor, or a single electrical conductor optically communicating with another electrical conductor through the optical slip ring is contemplated. That is, a bilateral implementation of the single elements is obvious in view of this invention. With respect to FIG. 2 for example, optical fiber 41 can be connected to optical emitter 11 and optical receiver 13. On the other side, fiber optic 43 may be connected to both of optical emitter 12 and optical receiver 14 with optical fiber 42 and electrical conductor 44 eliminated. Then, with proper control, bilateral transmission between optical fibers 41 and 43 may be established. Likewise, communications may be established in the bilateral fashion between optical fiber 41 or optical fiber 42 and electrical conductor 44.

MODE OF OPERATION

In this preferred embodiment, acoustic signals are received by transducers attached to the marine seismic cable 63 (FIG. 7) which then, through appropriate transducing, provide optical signals which are received on optical fiber 43. The optical signals are changed into electrical signals and output as optical signals representative of those electrical signals from light optical emitter 12. The optical signals are received by optical receiver 13, changed to electrical signals and then again to optical signals for transmission on optical fiber 42 to the appropriate electronics aboard ship 60. Thus the optical signals are transferred via the optical slip ring of this invention.

Command signals from the ship are optically transmitted via optical fiber 41 to the optical slip ring. They are there changed into electrical signals and sent out as optical signals from the LED of optical emitter 11. Optical receiver 14, on the other side of the optical slip ring receives the optical signals 14 and converts them directly into electrical signals 44 representative of the transmitted optical signals for control purposes along the seismic cable 63.

Of major importance is the fact that the optical slip ring of this invention is contemplated for use whenever communication between elements that rotate relative to each other must be maintained—certainly the invention contemplates far broader use than seismic marine cable adaptation.

Those skilled in the art are aware that this optical slip ring may be used in connection with and in parallel with the mechanical slip ring and capacitive slip ring mentioned above. Also, bilateral transmission along single elements is contemplated. The use of a focusing lens permitting varying placements of emitters and receivers is contemplated. Also, the selection of components obviously may differ from those set out herein. The invention is limited only by the appended claims.

What is claimed is:

1. An optical slip ring for bilateral transmission of optical signals comprising:
(a) first optical fiber means and second optical fiber means, the optical fiber means being free to rotate with respect to each other;
(b) at least two optical emitters, a first emitter connected to the first optical fiber means for receiving first optical signals therefrom and for emitting second optical signals corresponding to the first optical signals, and a second emitter connected to the second optical fiber means for receiving third optical signals therefrom and for emitting fourth optical signals corresponding to the third optical signals;
(c) at least two optical receivers, a first receiver connected to the first optical fiber means, activated by the fourth optical signals received from the second emitter to transmit fifth optical signals corresponding to the fourth optical signals from the second emitter to the first optical fiber means, and a second receiver connected to the second optical fiber means, activated by the second optical signals received from the first emitter to transmit sixth optical signals corresponding to the second optical signals from the first emitter to the second optical fiber means; and (d) first mounting means for mounting and positioning the first optical emitter off center and the first optical receiver on the axis of rotation and second mounting means for mounting and positioning the second optical emitter off center and the second optical receiver on the axis of rotation, the emitters and receivers being positioned to permit optical communication between the first optical emitter and the second optical receiver, and between the second optical emitter and the first optical receiver, the first and second mounting means being free to rotate with respect to each other.

2. The optical slip ring of claim 1 further comprising a lens interposed between the first and the second mounting means wherein the first and second optical emitters are positioned off center on the first and second mounting means, respectively, and are aimed at the lens so that the light emitted falls on the second and first optical receivers, respectively.

3. The optical slip ring of claim 2 wherein the optical emitters each comprise a fiber optic receiver circuit for transforming the optical signals into electrical signals and a fiber optic transmitter circuit for transforming the electrical signals into optical signals.

4. The optical slip ring of claim 3 wherein the optical receivers each comprise a fiber optic receiver circuit for transforming optical signals from the optical emitters into corresponding electrical signals and a fiber optic transmitter circuit for transforming the corresponding electrical signals into optical signals.

5. The optical slip ring of claim 1 wherein the optical emitters each comprise a fiber optic receiver circuit for transforming the optical signals into electrical signals and a fiber optic transmitter circuit for transforming the electrical signals into optical signals.

6. The optical slip ring of claim 5 wherein the optical receivers each comprise a fiber optic receiver circuit for transforming optical signals from the optical emitters into corresponding electrical signals and a fiber optic transmitter circuit for transforming the corresponding electrical signals into optical signals.

7. The optical slip ring of claim 2, 3, 6 or 4 wherein the first optical fiber means comprises a first optical fiber connected to the first emitter and a second optical fiber connected to the first receiver, and the second optical fiber means comprises a third optical fiber connected to the second emitter and a fourth optical fiber connected to the second receiver.

8. An optical slip ring for bilateral optical transmission comprising:

(a) optical fiber means and electrical conductor means, the fiber means and the conductor means being free to rotate with respect to each other;

(b) at least two optical emitters, a first emitter connected to the optical fiber means for receiving first optical signals therefrom and for emitting second optical signals corresponding to the first optical signals, and a second emitter connected to the electrical conductor means for receiving first electrical signals therefrom and for emitting third optical signals corresponding to the first electrical signals;

(c) at least two optical receivers, a first receiver connected to the optical fiber means, activated by the third optical signals received from the second emitter to transmit fourth optical signals corresponding to the third optical signals from the second emitter to the optical fiber means, and a second receiver connected to the electrical conductor means activated by the second optical signals received from the first emitter to transmit second electrical signals corresponding to the second optical signals from the first emitter to the electrical conductor means; and (d) first mounting means for mounting and positioning the first optical emitter off center and the first optical receiver on the axis of rotation, and second mounting means for mounting and positioning the second optical emitter off center and the second optical receiver on the axis of rotation, the emitters and receivers being positioned to permit optical communication between the first optical emitter and the second optical receiver, and between the second optical emitter and the first optical receiver, the first and second mounting means being free to rotate with respect to each other.

9. The optical slip ring of claim 8 further comprising a lens interposed between the first and the second mounting means wherein the first and second optical emitters are positioned off center on the first and second mounting means respectively, and are aimed at the lens so that the light emitted falls on the second and first optical receivers, respectively.

10. The optical slip ring of claim 9 wherein the first optical emitter comprises a fiber optic receiver circuit for transforming the first optical signals into third electrical signals, and a fiber optic transmitter circuit for transforming the third electrical signals into the second optical signals, and wherein the second optical emitter comprises at least one light emitting diode for transforming the first electrical signals into the third optical signals.

11. The optical slip ring of claim 10 wherein the first optical receiver comprises a fiber optic receiver circuit for transforming the third optical signals from the second emitter to fourth electrical signals, and a fiber optic transmitter circuit for transforming the fourth electrical signals into the fourth optical signals, and wherein the second optical receiver comprises at least one photodiode for transforming the second optical signals into the second electrical signals.

12. The optical slip ring of claim 8 wherein the first optical emitter comprises a fiber optic receiver circuit for transforming the first optical signals into third electrical signals, and a fiber optic transmitter circuit for transforming the third electrical signals into the second optical signals, and wherein the second optical emitter comprises at least one light emitting diode for transforming the first electrical signals into the third optical signals.

13. The optical slip ring of claim 12 wherein the first optical receiver comprises a fiber optic receiver circuit for transforming the third optical signals from the second emitter to fourth electrical signals, and a fiber optic transmitter circuit for transforming the fourth electrical signals into the fourth optical signals, and wherein the second optical receiver comprises at least one photodiode for transforming the second optical signals into the second electrical signals.

14. The optical slip ring of claim 8, 9, 12, 10, 13 or 11 wherein the optical fiber means comprises a first optical fiber connected to the first emitter and a second optical fiber connected to the first receiver and the electrical conductor means comprises a first electrical conductor connected to the second emitter and a second electrical conductor connected to the second receiver.

15. An optical slip ring for bilateral transmission of optical signals comprising:
 (a) first electrical conductor means and second electrical conductor means, the conductor means being free to rotate with respect to each other;
 (b) at least two optical emitters, a first emitter connected to the first electrical conductor means for receiving first electrical signals therefrom and for emitting first optical signals corresponding to the first electrical signals, and a second emitter connected to the second electrical conductor means for receiving second electrical signals therefrom and for emitting second optical signals corresponding to the second electrical signals;
 (c) at least two optical receivers, a first receiver connected to the first electrical conductor means, activated by the second optical signals received from the second emitter to transmit third electrical signals corresponding to the second optical signals from the second emitter to the first electrical conductor means, and a second receiver connected to the second electrical conductor means, activated by the first optical signals received from the first emitter to transmit fourth electrical signals corresponding to the first optical signals from the first emitter to the second electrical conductor means; and
 (d) first mounting means for mounting and positioning the first optical emitter off center and the first optical receiver on the axis of rotation, and second mounting means for mounting and positioning the second optical emitter off center and the second optical receiver on the axis of rotation, the emitters and receivers being positioned to permit optical communication between the first optical emitter and the second optical receiver, and between the second optical emitter and the first optical receiver, the first and second mounting means being free to rotate with respect to each other.

16. The optical slip ring of claim 15 further comprising a lens interposed between the first and the second mounting means wherein the first and second optical emitters are positioned off center on the first and second mounting means, respectively, and are aimed at the lens so that the light emitted falls on the second and first optical receivers, respectively.

17. The optical slip ring of claim 16 wherein the optical emitters each comprise at least one light emitting diode for transforming electrical signals into optical signals.

18. The optical slip ring of claim 17 wherein the optical receivers each comprise at least one photo diode for transforming the optical signals into electrical signals.

19. The optical slip ring of claim 15 wherein the optical emitters each comprise at least one light emitting diode for transforming electrical signals into optical signals.

20. The optical slip ring of claim 19 wherein the optical receivers each comprise at least one photo diode for transforming the optical signals into electrical signals.

21. The optical slip ring of claim 15, 16, 19, 17, 20 or 18 wherein the first electrical conductor means comprises a first electrical conductor connected to the first emitter and a second electrical conductor connected to the first receiver, and the second electrical conductor means comprises a third electrical conductor connected to the second emitter and a fourth electrical conductor connected to the second receiver.

22. An optical slip ring for bilateral transmission of optical signals comprising:
 (a) a first and a second optical fiber;
 (b) a third optical fiber and an electrical conductor;
 (c) at least two optical emitters, a first emitter connected to the first optical fiber for receiving first optical signals therefrom and for emitting second optical signals corresponding to the first optical signals, and a second emitter connected to the third optical fiber for receiving third optical signals therefrom and for emitting fourth optical signals corresponding to the third optical signals;
 (d) at least two optical receivers, a first receiver connected to the second optical fiber, activated by the fourth optical signals from the second emitter to transmit fifth optical signals corresponding to the fourth optical signals from the second emitter to the second optical fiber, and a second receiver connected to the electrical conductor activated by the second optical signals from the first emitter to transmit first electrical signals corresponding to the second optical signals to the electrical conductor; and
 (e) first mounting means for mounting and positioning the first optical emitter off center and the first optical receiver on the axis of rotation, and second mounting means for mounting and positioning the second optical emitter off center and the second optical receiver on the axis of rotation, the emitters and receivers being positioned to permit optical communication between the first optical emitter and the second optical receiver, and between the second optical emitter and the first optical receiver, the first and second mounting means being free to rotate with respect to each other.

23. The optical slip ring of claim 22 further comprising a lens interposed between the first and second mounting means wherein the first and second optical emitters are positioned off center on the first and second mounting means, respectively, and are aimed at the lens so that the light emitted falls on the second and first optical receivers, respectively.

24. The optical slip ring of claims 22 or 23 wherein the optical emitters each comprise a fiber optic receiver circuit for transforming the optical signals into electrical signals and a fiber optic transmitter circuit for transforming the electrical signals into optical signals.

25. The optical slip ring of claim 24 wherein the first optical receiver comprises a fiber optic receiver circuit for transforming optical signals from the optical emitter into corresponding electrical signals and a fiber optic transmitter circuit for transforming the corresponding electrical signals into optical signals, and wherein the second optical receiver comprises at least one photodiode for transforming the optical signals into electrical signals.

* * * * *